Patented Apr. 8, 1952

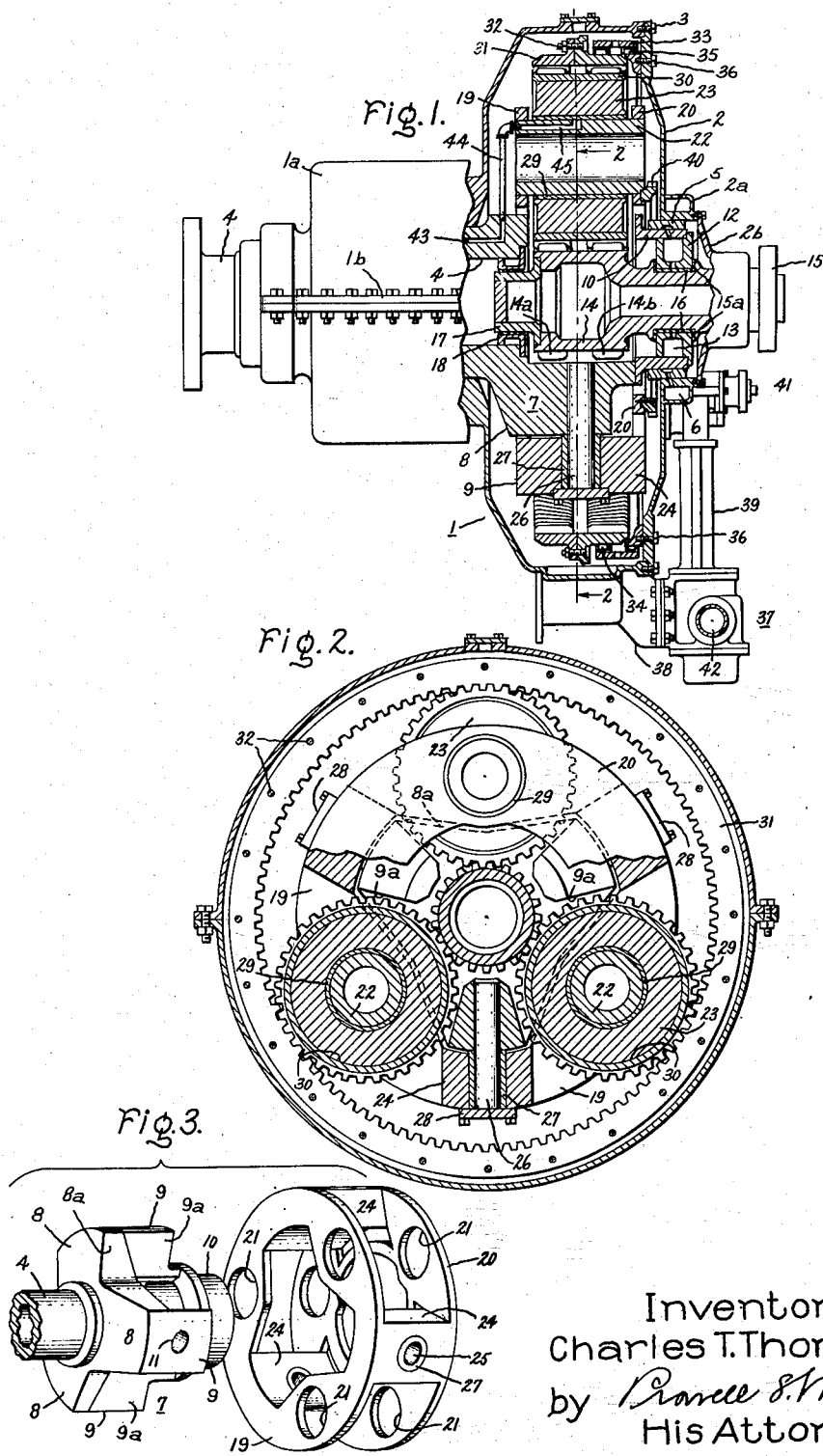
Inventor:
Charles T. Thompson,
by *Powell S. Mack*
His Attorney.

2,591,743

UNITED STATES PATENT OFFICE 2,591,743

CAGE CONSTRUCTION FOR PLANETARY GEARING

Charles T. Thompson, Swampscott, Mass., assignor to General Electric Company, a corporation of New York Application November 23, 1948, Serial No. 61,667

6 Claims. (Cl. 74—801)

This invention relates to gear trains of the planetary type, particularly to an improved cage arrangement for transmitting torque to the planetary gears in such a manner that there will be no tendency for the axes of the planets to deviate from their intended parallel relation with the axis of the sun gear. The invention is particularly applicable to planetary gears for the transmission of large amounts of power, for instance ship propulsion gears transmitting in the neighborhood of 5,000 H. P. and larger, where the torque transmitted is so large as to cause deflections of the cage, resulting in uneven contact of the gear teeth, when the arrangements of the prior art are used.

Heretofore, conventional practice in planetary gear design has been to make the cage an integral rigid assembly to which torque is applied at one end. Tests of a large planetary ship propulsion gear, of a capacity in the neighborhood of 7,500 H. P., have shown that this type of construction results in torsional deflection of the cage structure, with the result that the axes of the planet gears assume a "skewed" relation to the axis of the sun and ring gears, and tooth contact becomes uneven, the noise level of the gears in operation increases objectionably, and the life of the gears is appreciably shortened. The purpose of the present arrangement is to provide an improved cage construction which prevents this torsional deflection with the resulting deviation of the planet axes from their intended optimum relation with the sun and ring gears.

Other objects and advantages will be apparent from the following description taken in connection with the accompanying drawings in which Fig. 1 is a partial sectional view of a planetary gear incorporating the invention; Fig. 2 is a sectional view taken on the plane 2—2 in Fig. 1; and Fig. 3 is a perspective exploded view of the improved cage construction by itself.

Referring now more particularly to Fig. 1, my improved planetary gear includes a housing indicated generally at 1, as a split casing with a bolted flanged joint at 1b, and having a separately formed end plate 2 secured by suitable fastenings 3. Journalled in the housing 1 is an input shaft 4, which may be supported by a suitable journal bearing (not shown) located in the end housing portion 1a. A thrust bearing, which may be of any known type, but is preferably of the well-known Kingsbury type, may also be located in housing portion 1a adjacent the journal bearing. The housing portion 1a is shown in elevation only in Fig. 1, since details of the journal and Kingsbury bearing are not material to an understanding of the present invention. The housing end plate 2 has a central portion 2a forming a support for journal bearing 5 surrounded by an annular chamber 6, which serves as an oil supply reservoir as noted hereinafter. Secured to the housing portion 2a is an end plate member 2b which forms a cylindrical housing containing suitable shaft seal devices, which are not shown in detail since the particular type of seal used is not material.

As indicated above, the input shaft 4 is supported by suitable bearings in housing portion 1a and is secured to, or formed integral with, an inner cage member indicated generally at 7. This inner cage member has a plurality of radially extending arms 8, each having an outer axially extending portion 9 connected to or formed integrally with a cylindrical end portion 10 having an outer surface supported in the journal bearing 5. To make more clear the shape of this inner rotor member, it may be noted that the axially extending portion 9 has side surfaces 9a which lie almost in a radial plane through the axis of the gearing, as may be seen in Fig. 2, so that they are not co-planar with the side surfaces 8a of the radially extending arms 8. Each of the axially extending arm portions 9 are provided with a radially extending bore 11 for a purpose noted hereinafter.

Secured within the cylindrical end portion 10 of the inner cage member 7 is a journal bearing member 12, which may define an annular oil reservoir 13. For purposes of assembly, the journal bearing member 12 may be made in two or more segments secured into the continuous ring member 10 by any suitable fastening means (not shown because of the small scale of the drawings). Journalled in the member 12 is a pinion shaft 15, which may have the sun gear 14 formed integrally therewith as shown in Fig. 1. In order to provide smoothness of operation and multiple tooth contacts, the gears are all preferably of helical type, and to equalize the thrust they are preferably of the "double helical" type. That is, the pinion 14 is actually formed as two separate sets of teeth 14a and 14b, the helix angles being opposite, as will be readily understood by those familiar with helical gearing. Portions of the shaft 15 engage the journal bearing member 12 which may be provided with suitable Babbitt metal linings shown at 16. As may be seen in Fig. 1, the journal shaft portion is provided with circumferential flanges 15a engaging babbitted surfaces of the journals and serving as thrust bearings locating the shaft 15 in an axial direction.

Suitably secured to the left-hand end of the pinion 14, as for instance by welding, is a cylindrical member 17 forming a journal bearing supported in a babbitted ring member 18, which latter may be secured by any suitable fastening means (not shown) in the central bore of the input rotor 4.

It will be apparent from the above that the inner cage member 4 is supported at opposite ends by journal bearing 5 and a similar bearing in housing 1a, while the output pinion shaft 15 is journalled within rotor 7 by means of the bearing members 12, 18.

The planet-gear-carrying portion of the novel two-part cage assembly may be seen best in the perspective view of Fig. 3. It comprises two axially spaced annular wall portions 19, 20. As may be seen by comparison with Fig. 1, the annular side wall members 19, 20 are provided with circumferentially spaced openings 21 for receiving the shafts 22 of the planets 23. The side wall members 19, 20 are secured together by a plurality of "bridge" members 24. As may be seen in Fig. 2, these bridge members 24 are arranged between each adjacent pair of planet gears 23. It will be seen that the bridge members are in adjacent relation to the axially extending portions 9 of the inner rotor 7, and each is provided with a bore 25 aligned with the bore 11 of the inner rotor arms. The inner and outer cage members are secured together in torque transmitting relation by a plurality of radially arranged pins 26, which are secured, as by pressing or other suitable means, in one cage member and are free to rotate in the other cage member. As shown in the drawings, the pin 26 may be pressed into the bore 11, being left free to rotate in a bushing 27 secured in the bridge portion 24. These pins may be positively held in place against the action of centrifugal force by means of cap plates 28 secured to the bridge portions 24 over the bores 25 by any suitable fastening device. It will be apparent from Fig. 2 that the axes of the torque transmitting pins 26 are exactly radial; and it will be seen in Fig. 1 that each axis lies in a transverse plane through the center of the sun and planet gears, so that torque transmission to and from the cage is effected in a plane substantially at the middle of the face width of the sun and planet gears. Those skilled in the art will appreciate that this is in sharp contrast to the prior art arrangements in which the torque was applied at one end of the planet carrying cage structure, i. e. at a location spaced a substantial distance axially from the middle of the gears.

As shown in the drawings, the planet gears 23 are of composite construction having a babbitted bore 29 engaging the hollow shaft 22. The planet gear teeth are cut in a separate rim portion 30 which are shrunk or otherwise suitably secured to the gear body 23.

As shown in Figs. 1 and 2, the planets mesh with a surrounding ring gear 31, which for convenience of manufacturing may be formed as two separate rings secured together by the threaded fastenings 32. This facilitates manufacture of the oppositely skewed helical gear teeth. Ring gear 31 is located in free floating relation around the pinions 23 by means of an annular coupling sleeve 33. This has internal teeth or splines meshing with a first set of teeth 34 formed on ring gear 31, and with a second set of teeth 35 formed on a ring secured to end plate 2 by threaded fastenings 36. With this arrangement, torque exerted on the ring gear by the action of the planet gears is transmitted to the casing by means of the coupling sleeve 33, while at the same time the ring gear is permitted to "float" axially so as to adjust itself to the best mesh with the planet teeth.

While the lubrication system for this gear is not important to an understanding of the present invention, it may be noted briefly that a lubrication pump, indicated generally at 37, is bolted to an extension 38 of casing 1, being driven by means of a shaft in housing 39 by means of gearing including a pinion (not shown) meshing with a ring gear 40 bolted to the cage side plate 20. This gear train for driving pump 37 may also drive a power take-off indicated at 41, which may be connected to a tachometer for indicating the speed of the gearing or to any other appropriate driven device. While the type of pump used is not important here, it may preferably be an ordinary positive displacement gear type pump, receiving oil from the bottom of housing 1 through passages in the casing extension 38 and delivering oil under pressure from the conduit 42, from which oil is supplied by suitable piping, coolers, strainers, etc. (not shown) to the various parts of the gear needing lubrication. For instance, lubricant will be supplied to the annular chamber 6 formed in the housing end portion 2a, whence it flows through drilled holes in the members 5, 10, into the annular chamber 13 of the journal member 12, thence through drilled holes to the babbitted bearing surface at 16. This oil will also of course lubricate the journal bearing 5. Oil may be supplied to the planet gears by means of bore 43 communicating with a radially extending pipe 44 and an axial bore 45 in the fixed hollow shaft 22. Suitable radial drilled holes supply lubricant to the babbitted bore of the pinions 23.

The operation of the gearing will be apparent from the above description of the structure.

While the shaft 4 has, for convenience in the above discussion, been described as the input shaft, and rotor 15 as the output shaft, it will be apparent to those skilled in the art that it is immaterial which shaft is driving and which is driven. As a matter of fact, in a reduction gear for driving a marine propeller, the sun pinion shaft 15 would be the high speed input shaft and rotor 4 would be connected to the propeller shaft.

With my improved planetary gear construction, torque is transmitted between the respective gears and from the planet gears to the cage without imposing any strong torsional stresses on the planet-supporting cage structure. The flexible or self-aligning connection provided by the radial torque-transmitting pins 27 at the center of the gears insures that no torsional distortion will be produced in the outer cage member tending to skew the axes of the planets out of their intended parallel relation with the axis of the sun gear. The result is a great improvement in evenness of tooth wear, noise level of the gear in operation, and life of the teeth.

While only one specific embodiment has been described herein, it will be apparent to those skilled in the art that many changes may be made in the mechanical details of gearing incorporating my invention. For instance, while double helical teeth have been shown on the gears in the drawing, it may in some cases be advantageous to use plain spur teeth or teeth of other types. Furthermore, suitable anti-friction bearings might be substituted for the plain journal bearings shown. I intend to cover by the appended claims all such modifications as fall within the true scope of the invention. One such modified form is disclosed in the copending application of N. A. Smith and K. L. Darrah, Serial No. 68,898, filed January 3, 1949.

What I claim as new and desire to secure by Letters Patent of the United States is:

1. In a planetary gear having a sun pinion, a ring gear, and a plurality of planet pinions interposed therebetween, each of the planet pinions having a shaft member projecting from either end thereof, the combination of a cage assembly supporting the planets and including an inner cage member connected to a torque transmitting shaft, an integral annular outer cage member surrounding and freely spaced from the first member and having axially spaced means for supporting the respective ends of the planet pinion shafts, and torque-transmitting means connecting the inner and outer cage members and located substantially in a transverse plane through the mid-portion of the outer cage member whereby torque is transmitted between the inner and outer cage members substantially at the middle of the meshing face width of the gear teeth.

2. In a planetary gear having a sun pinion, a ring gear, and a plurality of planet pinions meshing therewith, each planet having a shaft member projecting from either end thereof, the combination of a cage assembly supporting the planets and including an inner cage member having radially projecting arms with portions disposed between the respective pairs of planets and adapted to transmit torque, an integral annular outer cage member surrounding and freely spaced from the inner member and having axially spaced means for supporting the respective ends of the planet pinion shafts, and circumferentially spaced means connecting said arm portions with the outer cage member in concentric spaced relation, said connecting means being located substantially in a transverse plane through the middle of the outer cage member, whereby torque is transmitted between the inner and outer cage members at a location substantially at the middle of the meshing face width of the gear teeth.

3. A planetary gear train in accordance with claim 2 in which the torque-transmitting connecting means are a plurality of circumferentially spaced dowel pins, each pin having one end portion carried in one of the cage members and another end portion engaging, but free to have limited oscillatory motion about its own axis relative to, the other cage member.

4. Planetary gearing in accordance with claim 2 in which the torque-transmitting connecting means are radially extending members each having end portions engaging the inner and outer cage members and having a degree of flexibility in torsion about their own axes to substantially prevent the transmission of torque from the inner to the outer cage member about a radial axis through the connecting means.

5. In a planetary gear train having a sun pinion, a ring gear, and a plurality of planet pinions interposed therebetween, each planet having a shaft member projecting from either end thereof, the combination of a cage assembly supporting the planets and including an inner cage member connected to a torque-transmitting shaft and having a plurality of radially extending arm portions, an annular outer cage member surrounding the inner member and having axially spaced ring members with portions supporting the respective ends of the planet pinion shafts, the outer cage member including circumferentially spaced bridge members connecting the axially spaced ring portions between the respective pairs of planets, and torque-transmitting means between said inner and outer cage members including radial pins connecting the respective arms of the inner cage member with the bridge members of the outer cage member, each of the connecting pins being free to have limited oscillatory motion about its own axis relative to at least one of the cage members, and each pin being located with its axis lying substantially in a transverse plane through the middle of the face width of the gear teeth.

6. In a planetary gear train having a sun pinion, a ring gear, and at least one planet pinion interposed therebetween, the combination of means supporting the planet including an inner rotor member adapted to transmit torque, a member rotatably supporting the planet gear, and torque transmitting means connecing said inner rotor member with said supporting member including a pin arranged with its axis radial and located in a transverse plane substantially at the middle of the meshing face width of the gear teeth, a portion of the pin having an oscillating bearing fit with at least one of said members, whereby limited oscillation of a portion of the inner rotor relative to the planet support member about a radial axis is effected freely in order that no torque tending to skew the axis of the planet gear from its intended parallel relation relative to the other gears will be transmitted to the planet support member.

CHARLES T. THOMPSON.

REFERENCES CITED

The following references are of record in the file of this patent:

FOREIGN PATENTS

| Number | Country | Date |
| --- | --- | --- |
| 323,065 | Germany | July 15, 1920 |